Aug. 26, 1941.   J. V. CARLSON   2,253,687
TOOL GRINDING DEVICE
Filed April 3, 1939   3 Sheets-Sheet 1
FIG. I.
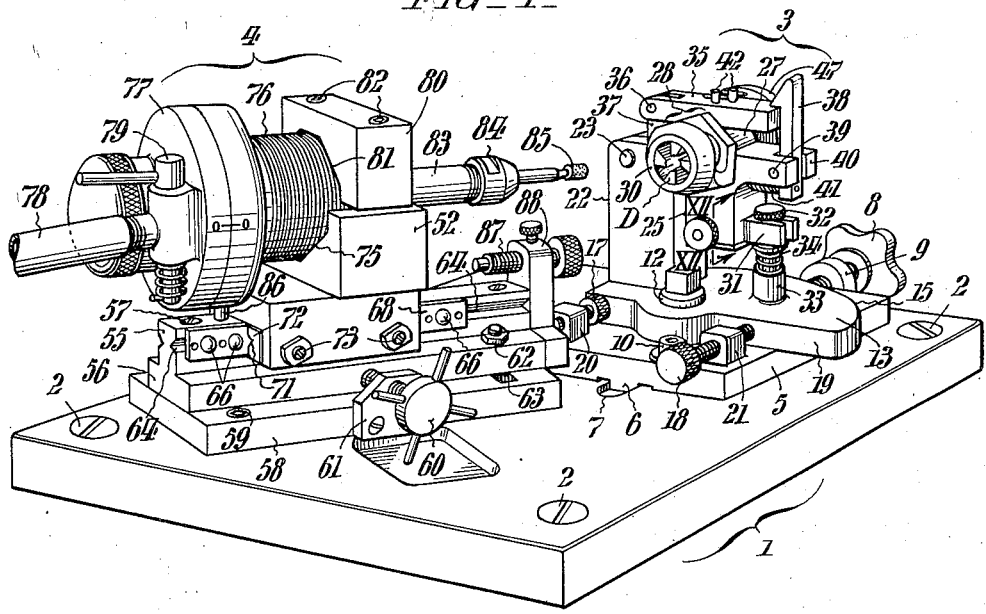
FIG. II.
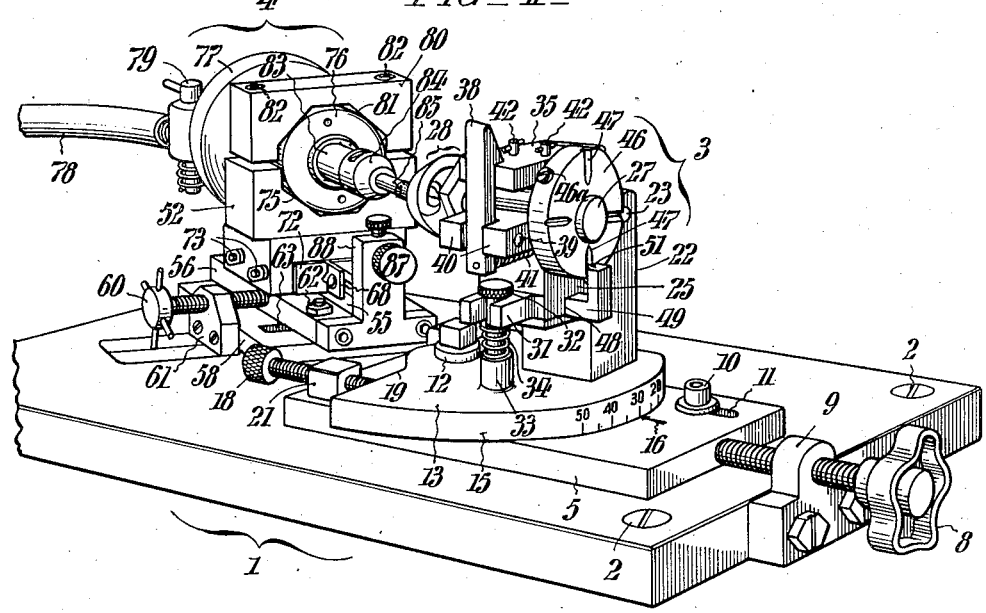
WITNESSES:
INVENTOR:
John V. Carlson,
BY
ATTORNEYS.

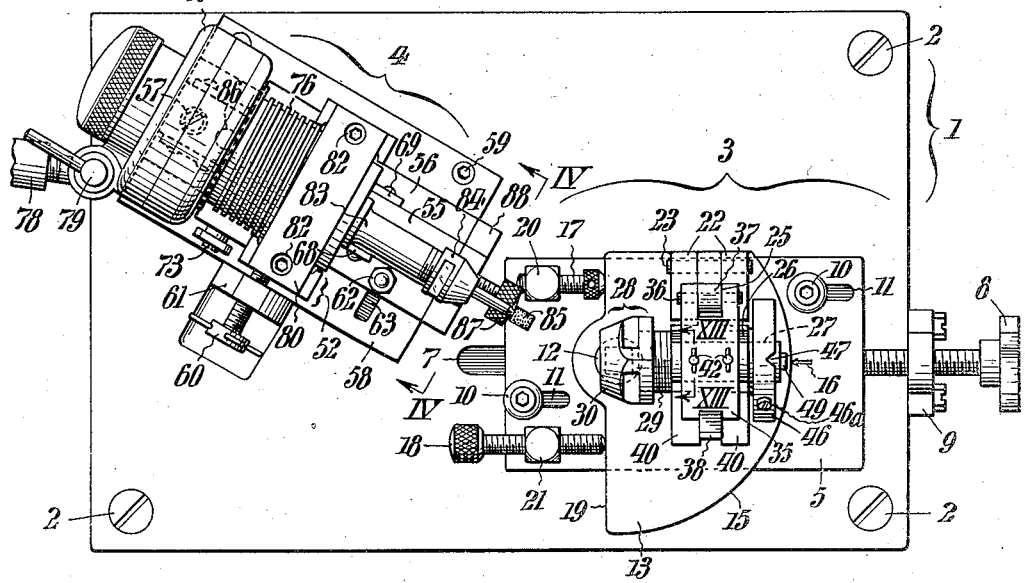
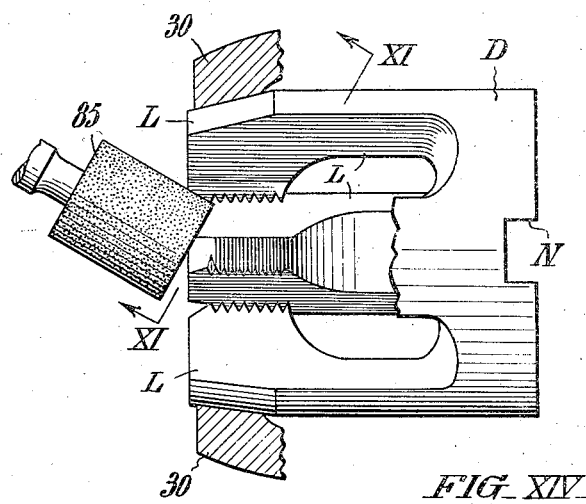
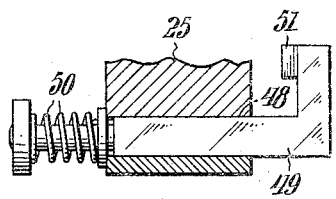
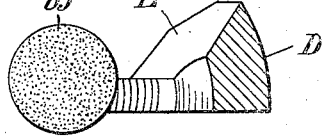
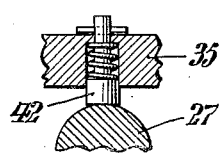
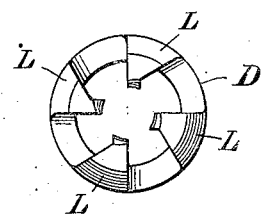
INVENTOR:
John V. Carlson,
BY Paul & Paul
ATTORNEYS.

Aug. 26, 1941.    J. V. CARLSON    2,253,687
TOOL GRINDING DEVICE
Filed April 3, 1939    3 Sheets-Sheet 3
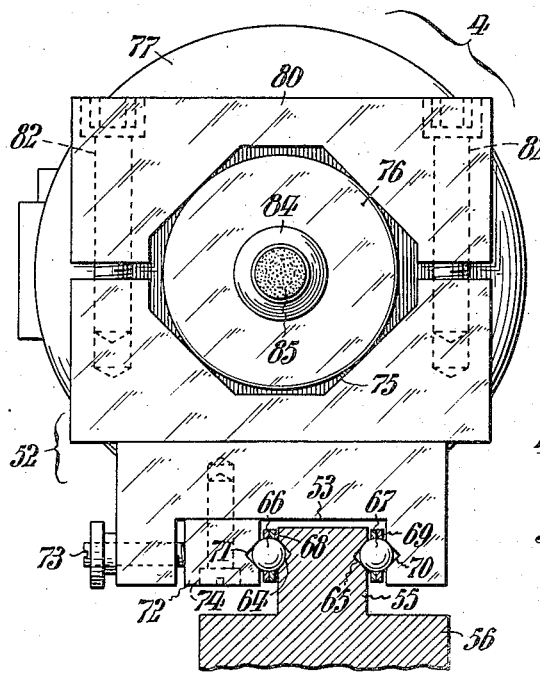
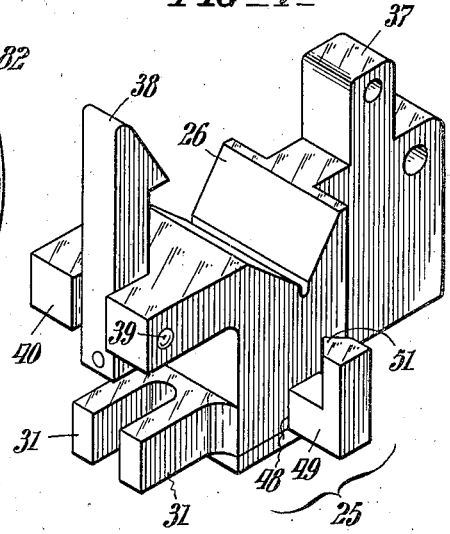
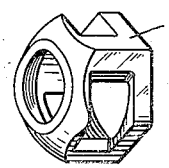
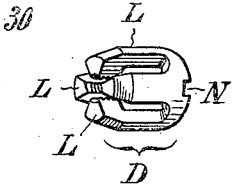
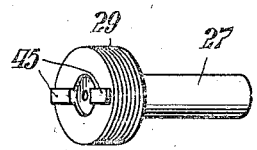
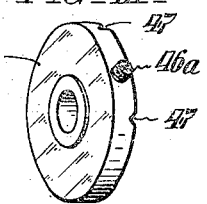
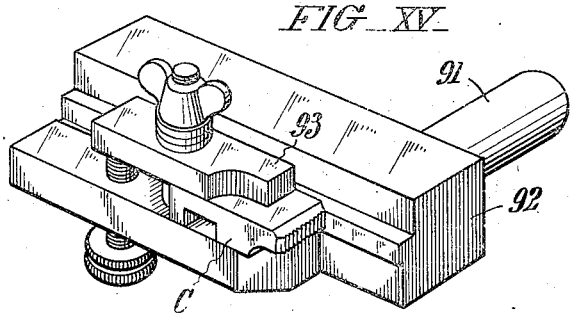
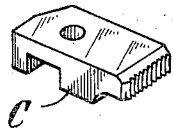
WITNESSES:
Hubert Fuchs
William Bell, Jr.
INVENTOR:
John V. Carlson,
BY Paul & Paul
ATTORNEYS.

Patented Aug. 26, 1941

2,253,687

UNITED STATES PATENT OFFICE 2,253,687

TOOL GRINDING DEVICE

John V. Carlson, Chicago, Ill., assignor to Union Special Machine Company, Chicago, Ill., a corporation of Illinois Application April 3, 1939, Serial No. 265,702

2 Claims. (Cl. 51—34)

This invention relates to grinding devices useful in reconditioning various kinds of cutting tools including so-called "acorn" threading dies such as commonly employed in small automatic screw machines and thread chasers of collapsible threading dies.

To sharpen acorn dies for example, it has heretofore been the custom to grind back the leading edges of the lands, with the result that said edges were quickly brought below the centers of the dies, and the dies thereby soon rendered useless.

The chief aim of my invention is to obviate this drawback, which desideratum I attain as hereinafter more fully disclosed, through provision of a simple and reliable grinding device whereby only the chamfered or tapered first threads of the dies are reground with formation at the same time of relief clearances rearward of the cutting edges. Thus with the device of my invention very little metal is cut away at each grinding and the useful life of the dies correspondingly prolonged.

Another object of my invention is to enable, through provision of improved adjustment facilities, the adaptation of a grinding device having the above attributes for operation on both right and left hand threading dies of different sizes, and for cutting at any desired angle to recondition the dies for the most efficient cutting action upon different materials.

Other objects and attendant advantages will appear from the following detailed description of the attached drawings, wherein Fig. I is a perspective view of a grinding device conveniently embodying my invention.

Fig. II is another perspective view of the device as it appears from another angle.

Fig. III shows the device in top plan.

Fig. IV is a fragmentary sectional view taken as indicated by the angled arrows IV—IV in Fig. III.

Figs. V, VI, VII, VIII and IX are perspective views of various parts which will be individually referred to later.

Fig. X is a fragmentary view partly in elevation and partly in section showing how an acorn threading die is sharpened in the device.

Fig. XI is a detail sectional view taken as indicated by the angled arrows XI—XI in Fig. X.

Figs. XII and XIII are detail sectional views taken as indicated respectively by the angled arrows XII—XII and XIII—XIII in Figs. I and III.

Fig. XIV shows the front end of an acorn die after having been sharpened in the device.

Fig. XV is a perspective view of an auxiliary or alternative part for holding chasers of collapsible dies in the device; and Fig. XVI is a perspective view of the die chaser after having been sharpened in accordance with my invention.

As herein illustrated my improved tool-grinding device has a base 1 in the form of an oblong plate arranged to be supported on the top of a table or work bench and secured thereto at corners by screws 2. Mounted on the base 1 in one corner is a unit 3 for supporting the tool which is to be ground; while the diagonally opposite corner of said base is occupied by a unit 4 for supporting the cutting implement by which the grinding is effected.

The tool supporting unit 3 includes an oblong slide carriage 5 which is disposed lengthwise of the base 1 and has a pendent tongue 6 in engagement with a guide slot 7 in said base, see Figs. I and III. The carriage 5 of the unit 3 is adjustable relative to the unit by means of a hand screw 8 whereof the shank is threadedly engaged in a fixed bearing lug 9 at the right hand end of the base 1, and fixable in adjusted positions by headed clamp screws 10 whereof the shanks pass downwardly through longitudinally-extending slots 11 in said carriage and engage into the base 1. Fulcrumed for angular adjustment about a pin 12 upstanding from the carriage 5 is a support in the form of a sector 13 whereof the curved edge 15 is concentric with said pin and has numbered scale graduations, see Fig. II, for coordination with an index mark 16 on said carriage. For the purpose of angularly shifting the sector 13 and for fixing it in shifted positions, I have provided screws 17 and 18 which bear against the straight edge 19 of said sector at opposite sides of the pin 12, and which are engaged in studs 20 and 21 on the carriage 5. Rising from the sector 13 is a clevised bearing post 22 whereon is fulcrumed, by means of a transverse pin 23, an arm 25, which, see Fig. V, has a V-groove 26 in its top constituting a cradle for the cylindric shank 27 of a horizontal axis tool holder or chuck 28 with a threaded enlargement 29 at its forward or outer end engaged by a chuck nut 30. At the lower part of its outer or swinging end, the arm 25 is formed with a projecting lug 31 which is centrally notched as shown to clear the shank of an adjusting thumb screw 32 engaging axially downward into a boss 33 on the sector 13, see Figs. I and II. A helical spring 34 in compression between the bottom of the lug 31 and the top of the boss 33 tends to urge the arm 25 upward to maintain the top of said lug in contact with the head of the adjusting screw 32. The tool holder 28 is rotatably held in the V-notch 26 of the arm 25 by a hold down means which includes a bar 35 pivotally connected at one end by a transverse pin 36 to an ear 37 on the arm 25 and engaged at its swinging end by a retractable latch hook 38, which, see Figs. I and II, is pivoted at 39 to laterally projecting ear 40 on said arm somewhat above the projection 31. A spring shown at 41 in Figs. I and II tends to keep the latch hook 38 in engaging position. At an intermediate point, the bar 35 carries a pair of spring pressed plungers 42 which bear downwardly upon the cylindrical shank 27 of the chuck 28 as shown in Fig. XIII and by friction serve to prevent accidental rotation in the arm 25.

As herein exemplified the tool holder 28 is in the form of a chuck capable of receiving hollow annular threading dies of the acorn type such as the one shown at D, Fig. VII, X having a series of circumferentially spaced chased lands L, the chuck nut 30 being internally configured to wedge fit over the tapered end of said die in the manner illustrated in Fig. X. At its front end, the threaded head portion 29 of the chuck shank 27 is provided with a pair of diametral key projections 45 adapted to engage the usual notches N at the back of the die D to prevent relative rotation of the latter. To the rear end of the chuck shank 27 is affixed by means of a set screw 46a, an indexing disk 46 (Figs. II, III and IX) having four notches 47 corresponding to the four lands on the illustrated die D. Lodged in a slot 48 at the bottom of the arm 25 is a slide bar 49, which, see Fig. XII, is subject to a compression spring 50, whereby a sharp upward projection 51 on said bar is yieldingly urged toward the exposed face of the indexing disk 46 and adapted to successively engage the notches 47 of the latter as shown in Fig. II when the chuck is turned for successive presentation of the die lands to the grinding implement in a manner presently explained.

The unit 4 comprises a carriage 52 having a longitudinal slot 53 in its bottom for capacity to straddle the vertical longitudinal rib 55 of a guide rail 56. As shown in Figs. I and III, the rail 56 is pivoted at one end to a vertical screw stud 57 at the corresponding end of an oblong pad 58 which is secured by cap screws 59 to the base 1 diagonally of the upper left hand corner of the latter (Fig. III). By means of a hand screw 60 threadedly engaged in a bearing 61 at one side of the plate 58, the guide rail 56 may be laterally shifted horizontally about the stud 57 as an axis. A headed screw shown at 62 and engaging a transverse undercut slot 63 in the base flange of the rail at its swinging end, serves to hold the latter down on the pad. From Figs. I and IV it will be observed that the rib 55 of the rail has V-groove raceways, 64 and 65 in its opposite sides engaged by bearing balls 66 and 67 held in spaced relation by suitably apertured retainers 68 and 69 respectively. The balls 67 also engage a raceway 70 at one side of the slot 53 in the bottom of the carriage 52. The balls 66, on the other hand, engage a raceway 71 in a gib 72 which is adjustable laterally of the slot 53 in the slide 52 by means of a pair of screws 73. The gib 72 is held in place by cap screws 74 whereof the shanks pass upwardly through clearance holes in said gib and engage into the carriage 52. By virtue of the provisions just described, it is possible to preclude both up and down and side-wise play of the carriage 52, and to take up for wear of the balls 66 and 67 and of the raceways in which they travel. As shown in Figs. I, II and IV, the carriage 52 is provided with a central depression 75 of semi-hexagonal configuration in its top to serve as a cradle for the diametrically reduced cylindrical forward end portion 76 of the casing of a horizontally-arranged high speed rotary or turbine motor 77 which may be operated by compressed air or other pressure fluid medium supplied through a connecting hose 78, and which is controllable by a throttle valve shown at 79. The motor 77 is held in place by a clamp block 80 with a semi-hexagonal central recess 81 in its bottom to engage over the reduced front end portion 76 of the motor casing, said block being secured to the carriage 52 by a pair of screws 82. The threaded outer end of the shaft 83 of the motor 77 carries a chuck 84 for receiving the shank of a grinding wheel 85, said shaft thus constituting the spindle for the grinding wheel and being aligned axially in the direction of movement of the carriage 52. The rearward travel of the carriage 52 is limited by a fixed stop 86 at the rear or pivoted end of the rail 56, and its forward travel toward the unit 3 is limited by a stop screw 87 which is adjustable in a bearing 89 at the front end of said rail.

In preparing the apparatus for grinding an acorn die, the die is secured in the chuck 28 as shown in the drawings and the indexing disk 46 adjusted circumferentially of the shank 27 of the tool holder 28 with its notches in proper relation to the lands of said die and fixed by means of the set screw 46a. The carriage 5 of the unit 3 is next properly adjusted on the bed plate 1 relative to the unit 4 by means of the hand screw 8, and fixed in the desired position of adjustment by the clamp screws 10. The sector 13 is in turn adjusted about its pivot 12 by means of the set screws 17 and 18 and with the aid of the scale graduations on its edge and the mark 16, to predetermine the desired angle of grinding. The arm 25 of the unit 3 is next adjusted vertically by means of the thumb screw 32 to shift the axis of the die D either above or below the axis of the grinding tool depending upon whether the die is of the right hand or left hand variety. With the foregoing preparations completed, the carriage 52 of the unit 4 is moved forwardly on its track rail 56 by hand from the normally retracted position in which it is shown in Figs. I and III to bring the grinding wheel 85 into the opening of the die and into proximity with the land L which is to be ground, the stop screw 87 having been previously set to limit such forward movement of said carriage. The guide rail 56 of the unit 4 is thereafter shifted on its pivot 57 by means of the hand screw 60, thereby causing the grinding wheel 85 to be moved laterally into grinding engagement with the first land of the die as shown in Figs. X and XI. After the desired depth of grind is attained, the chuck 28 is turned in the arm 25 to bring the next land of the die into position to be operated upon by the wheel 85 which land is then ground to the same extent as the first. This procedure is repeated until all the remaining lands of the die have been refinished. In this connection it will be apparent that any desired cutting angle may be predetermined by rotatively shifting the sector 15 about its fulcrum 12 by which the inclination of the chuck axis is changed relative to that of the grinding wheel 35. Moreover, by vertical adjustment of the arm 25 of the unit 3, it is possible to determine any desired amount of clearance behind the cutting edge at the leading thread of the die in a manner which will be obvious from Fig. XI. Furthermore, by adjusting the screw 87, the advance of the carriage 52 of the unit 4 may be limited with absolute accuracy to confine the grinding to the first thread of the die and thus prevent injury to the other threads.

The device is of course not restricted to grinding of the four land dies, since in practice disks 46 with different numbers of notches 47 are furnished for use with dies with correspondingly different plural lands.

In Fig. XV there is illustrated a holder 90 suitable for individual chasers of dies of the collapsible type such as shown at C in Fig. XVI. The holder 90 has a shank 91 corresponding in diameter to that of the shank 27 of the chuck 28 for fitment into the recess 26 of the arm 25 of the unit 3, and an oblong head 92 with a screw operated means 93 for clamping the chaser. The component chasers of each collapsible die are successively ground in the device without change in its setting, and, of course, without indexing of the holder.

Having thus described my invention, I claim:

1. A self-contained unit for interiorly grinding hollow tools, such as thread cutting dies, for attachment to a table or the like, comprising an oblong rectangular bed; a rotary holder for the tool mounted on the bed at one corner with its axis of rotation extending longitudinally of the bed; means for effecting vertical adjustment of said holder to determine the depth of relief, endwise adjustment for setting the point of grinding action, and circular adjustment to determine the grinding angle; a fixed track at the diagonally opposite corner of the bed arranged at an acute angle to the axis of the rotary tool holder; and a carriage for supporting a grinding wheel with its axis extending in the general direction of the track, said carriage being confined to travel back and forth on the track for movement of the grinding wheel into and out of the hollow of the tool during the grinding.

2. A self-contained unit for interiorly grinding hollow tools, such as acorn thread cutting dies, for attachment to a table or the like, comprising an oblong rectangular bed; a rotary holder for the tool; a carriage adjustable longitudinally of the bed in one corner of the latter; a vertical axis swivel support for the tool holder on the carriage; means for effecting vertical adjustment of said holder to determine the depth of relief, endwise adjustment for setting the point of grinding action, and circular adjustment to determine the grinding angle; a fixed track in the diagonally opposite corner of the bed arranged at an acute angle to the line of adjustment of the aforesaid carriage; a grinding wheel; a support for the grinding wheel; and a carriage on which the support for the grinding wheel is pivoted for angular adjustment in a horizontal plane, the last mentioned carriage being confined to travel back and forth on the track aforesaid for movement of the grinding wheel into and out of the hollow of the tool during the grinding.

JOHN V. CARLSON.